UNITED STATES PATENT OFFICE.

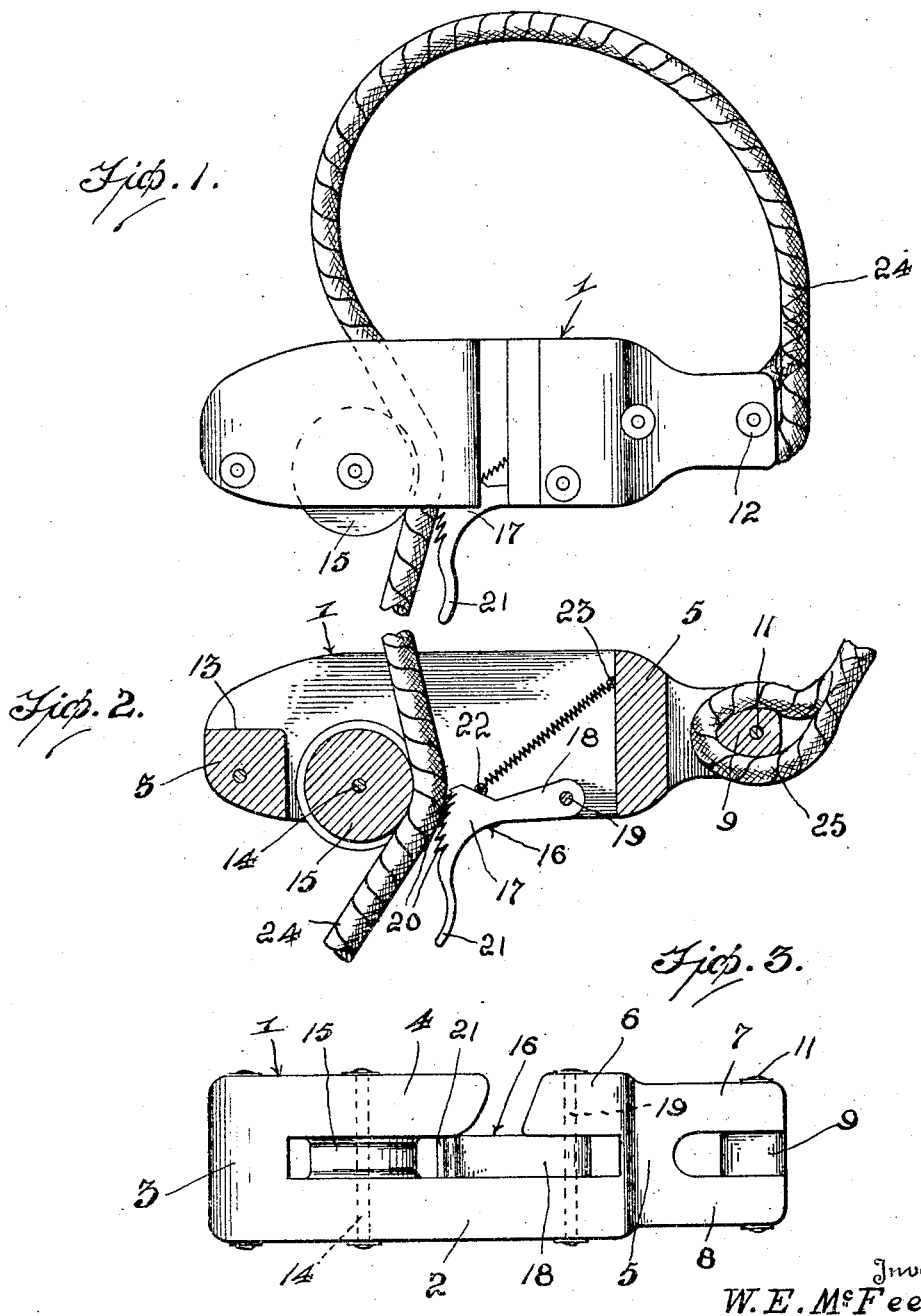

WILLIAM E. McFEE, OF MOUNT CARROLL, ILLINOIS.

CORN-SHOCK TIER.

1,235,217. Specification of Letters Patent. Patented July 31, 1917.

Application filed March 31, 1915. Serial No. 18,298.

*To all whom it may concern:*

Be it known that I, WILLIAM E. McFEE, a citizen of the United States, residing at Mount Carroll, in the county of Carroll and State of Illinois, have invented certain new and useful Improvements in Corn-Shock Tiers; and I do hereby declare the following to be a full, clear, and exact description of the invention, such as will enable others skilled in the art to which it appertains to make and use the same.

This invention relates to new and useful improvements in corn shock tiers, and has for its principal object to provide a device which is adapted to easily and quickly tie corn shocks and the like.

Another object of the invention is to provide a device which will effectively grip the tying rope and hold the same against slipping.

A further object of the invention is to provide a device which will effectively hold the rope around the shock and which may be tightened to such a degree as to prevent the shock from becoming loosened until the device is released.

Still another object of the invention is to provide a device wherein it is impossible for the rope or other tying means to become disconnected without first releasing the holding dogs manually.

With these and other objects in view, the invention consists in the novel combination and arrangement of parts which will be fully set forth in the following specification and accompanying drawings, in which, Figure 1 is a top plan view of a corn shock tier constructed in accordance with this invention, Fig. 2 is a horizontal sectional view, and Fig. 3 is an edge view in elevation of the device.

Referring to the drawings by characters of reference, the numeral 1 designates as an entirety the main body of the device, comprising a wood or metal block 2, which is formed at one end with the upward extension 3 that will be hereinafter known as the inner end and which in turn is formed at its upper terminal with the parallel extension 4 which extends to a point substantially one-half of the length of the member 2. A similar upward extension 5 is formed at the opposite end of the member 2 which will be hereinafter known as the outer end, and this extension is provided with the inwardly extending portion 6 which projects parallel with the member 2 and extends to a point near the terminal of the member 4 as clearly illustrated in Fig. 3. Formed at the outer end of the portion 5 are the parallel arms 7 and 8 which are connected near their outer terminals with the connecting element 9 which forms a guide around which the flexible member, with which the device coöperates, extends. A suitable reinforcing rivet 11 is extended centrally through the member 9 and is flanged at each end on the exterior of the arms 7 and 8 over suitable washers 12 as clearly illustrated in the drawings. A suitable groove or channel 13 is formed in the member 3 as clearly illustrated in Fig. 2, and this groove is arranged to form a chamber for the reception of the flexible member when the device is tied about a corn stalk or the like. The chamber 13 permits the flexible member to extend at right angles to the main body, so that the device may be used on shocks of considerable size and the top and bottom of the body prevents the flexible member from becoming caught in the blades of the corn constituting the shock at a point where the flexible member enters the body.

Rotatably mounted on a suitable rivet 14 is the pulley wheel 15 which is provided with a peripheral groove in which the flexible member passes. This pulley is located so that its periphery is spaced from the end of the member 4 as illustrated in the drawings, and acts as a guide on which the flexible member passes. Coöperating with the pulley is a suitable dog designated generally by the numeral 16 which comprises the body 17, having the arm 18 formed thereon, which is pivoted on the rivet 19 which extends through the member 6 and the member 2 as clearly shown in the drawings. The body 17 is provided with a plurality of teeth 20, and is formed with the lever 21 by which the dog is released. A suitable coil spring is attached as at 22 to the body 17 and the opposite end of said spring is attached as at 23 to the member 5, and it will be evident that the said spring will normally exert pull on the body to hold the dog into engagement with the flexible member when the same is passed through the opening provided therefor and is in position against the pulley.

It will be apparent from the foregoing that in use, the flexible member 24 is secured around the member 9 by means of the loop 25 and the opposite end thereof is passed around the shock or bundle to be tied and then slipped in the space between the ends of the members 4 and 6 so that the flexible member rests against the upper face of the body 2. The dog is then released and it will be evident that the spring will cause the flexible member to be thrust against the pulley 15, and upon exerting pull on the free end of the flexible member, it will be evident that the device will be tightened around the shock or bundle and will be held against accidental movement by means of the dog 16 engaging with the flexible member. In this way it will be evident that different degrees of tightness may be given to the flexible member about the shock and any danger of accidental releasing of the same is eliminated.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A shock tier comprising an elongated block having a longitudinally extending recess located centrally between its upper and lower sides and opening out through its inner and outer edges and through the inner parts of its outer end, a cord secured at one end to the inner end of the block, a pulley journaled in the recess near the outer end and outer edge of the block, the upper side of the block having a transverse slot located between the periphery of said pulley and said inner end, the side walls of the slot being inclined in the direction of said pulley to direct the cord on to the pulley during its insertion into the recess through the slot and to prevent the cord from being accidentally withdrawn through the slot during the operation of tying the shock, and a spring pressed dog pivoted within the recess near the outer edge of the block.

In testimony whereof I affix my signature in presence of two witnesses.

WILLIAM E. McFEE.

Witnesses:
OSCAR SISLER,
W. H. MADER.

Copies of this patent may be obtained for five cents each, by addressing the "Commissioner of Patents, Washington, D. C."